US 9,249,752 B2

(12) United States Patent
Donaldson et al.

(10) Patent No.: US 9,249,752 B2
(45) Date of Patent: Feb. 2, 2016

(54) SYSTEM IMPLEMENTING LOW-REDUCTANT ENGINE OPERATION MODE

(75) Inventors: George E. Donaldson, Chillicothe, IL (US); James J. Driscoll, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 2448 days.

(21) Appl. No.: 11/589,822

(22) Filed: Oct. 31, 2006

(65) Prior Publication Data
US 2008/0098726 A1 May 1, 2008

(51) Int. Cl.
F01N 3/00 (2006.01)
F02D 41/40 (2006.01)
F01N 3/20 (2006.01)
G01F 9/00 (2006.01)
G01F 23/30 (2006.01)
F02D 41/02 (2006.01)
F02D 41/24 (2006.01)

(52) U.S. Cl.
CPC ............ *F02D 41/401* (2013.01); *F01N 3/2066* (2013.01); *G01F 9/001* (2013.01); *G01F 23/30* (2013.01); *F01N 2610/02* (2013.01); *F01N 2900/08* (2013.01); *F01N 2900/1806* (2013.01); *F01N 2900/1814* (2013.01); *F02D 41/0235* (2013.01); *F02D 41/2422* (2013.01); *F02D 2250/36* (2013.01); *Y02T 10/24* (2013.01); *Y02T 10/44* (2013.01)

(58) Field of Classification Search
USPC ............ 60/274, 285, 286, 295, 297, 301, 303
See application file for complete search history.

(56) References Cited

U.S. PATENT DOCUMENTS

| 4,478,177 | A  | * | 10/1984 | Valdespino ............... 123/3 |
| 5,651,247 | A  |   | 7/1997  | Fränkle |
| 5,809,775 | A  | * | 9/1998  | Tarabulski et al. ........... 60/274 |
| 5,976,475 | A  | * | 11/1999 | Peter-Hoblyn et al. ........ 423/212 |
| 6,063,350 | A  |   | 5/2000  | Tarabulski et al. |
| 6,363,771 | B1 | * | 4/2002  | Liang et al. ................. 73/23.31 |
| 6,519,935 | B2 |   | 2/2003  | Weigl |
| 6,684,708 | B2 |   | 2/2004  | Weigl |
| 6,725,651 | B2 |   | 4/2004  | Itoh et al. |

(Continued)

FOREIGN PATENT DOCUMENTS

| JP | 2002 371831 | | 12/2002 | |
| JP | 2005071007 | * | 3/2005 | ..................... 60/286 |
| WO | WO 2006/087842 | | 8/2006 | |

OTHER PUBLICATIONS

PCT International Search Report; File Ref. 06-528; PCT/US2007/021910; International Filing Date: Oct. 12, 2007; Applicant: Caterpillar Inc.

*Primary Examiner* — Binh Q Tran
(74) *Attorney, Agent, or Firm* — Finnegan, Henderson, Farabow, Garrett & Dunner, LLP

(57) ABSTRACT

A control system for a power unit having a supply of fuel and a supply of reductant is disclosed. The control system may have a first sensor associated with the supply of fuel to generate a signal indicative of a quantity of fuel remaining. The control system may also have a second sensor associated with the supply of reductant to generate a signal indicative of a quantity of the reductant remaining. The control system may further have a controller in communication with the first and second sensors. The controller may be configured to affect operation of the power unit such that the remaining fuel is consumed before consumption of the remaining reductant.

20 Claims, 3 Drawing Sheets

(56) References Cited

U.S. PATENT DOCUMENTS

| | | | |
|---|---|---|---|
| 7,377,101 B2 * | 5/2008 | Mital et al. ..................... 60/275 |
| 2003/0033799 A1 | 2/2003 | Scheying | |
| 2006/0132145 A1 | 6/2006 | Enomoto | |
| 2006/0184307 A1 | 8/2006 | Kosaka | |
| 2007/0266703 A1 * | 11/2007 | Hirata et al. ..................... 60/299 |

* cited by examiner

SYSTEM IMPLEMENTING LOW-REDUCTANT ENGINE OPERATION MODE

TECHNICAL FIELD

The present disclosure is directed to a mode of engine operation and, more particularly, to a system that implements a conservation mode of engine operation in response to low levels of a reductant supply.

BACKGROUND

Internal combustion engines, including diesel engines, gasoline engines, gaseous fuel-powered engines, and other engines known in the art exhaust a complex mixture of air pollutants. These air pollutants may be composed of gaseous compounds such as, for example, the oxides of nitrogen (NOx). Due to increased awareness of the environment, exhaust emission standards have become more stringent, and the amount of NOx emitted from an engine may be regulated depending on the type of engine, size of engine, and/or class of engine. In order to ensure compliance with the regulation of these compounds, some engine manufacturers have implemented a strategy called Selective Catalytic Reduction (SCR).

SCR is a process where a gaseous or liquid reductant (most commonly a urea/water solution) is added to the exhaust gas stream of an engine and is absorbed onto a catalyst. The reductant reacts with NOx in the exhaust gas to form $H_2O$ and $N_2$. Although SCR is effective, the NOx-reduced emissions are only realized as long as the reductant is available for addition to the exhaust gas stream. In other words, when the supply of urea is depleted, the concentration of NOx in the exhaust emissions increases.

As the SCR process is becoming a possible strategy utilized to comply with environmental regulations, guidelines regarding the use of SCR are being contemplated. One such guideline may include requiring deactivation of a vehicle when the supply of urea runs low, and preventing operation of the vehicle thereafter until the supply has been replenished. Another such guideline may require limited utility, including the possibility that an engine without an adequate supply of urea would have a limited number of restarts While these guideline may adequately prevent excessive amounts of NOx from being expelled to the environment, they may be problematic. For example, a vehicle could become inconveniently stranded, costing the owner of the vehicle considerable time and resources.

An alternative strategy to disabling a vehicle in response to low levels of available urea may include providing a low-urea engine operating mode. One such mode is described in US Patent Publication No. 2006/0184307 (the '307 publication) by KOSAKA published on Aug. 17, 2006. The '307 publication discloses a travel assist system that searches a nearest service station based on navigation information, and predicts a quantity of aqueous urea solution consumed until the service station is reached. If a quantity of the remaining aqueous urea solution is not greater than the aqueous urea solution consumption by a predetermined value, a warning is provided to a user. Control conditions of a diesel engine enabling the vehicle to reach the service station without running short of the aqueous urea solution are then calculated, and an exhaust gas recirculation quantity is increased based on the calculation result. Thus, both the nitrogen oxides contained in the exhaust gas and a consumption of the aqueous urea solution are reduced.

Although the travel assist system of the '307 publication may suitably enable a vehicle to reach a service station without running completely out of the aqueous urea solution, it may still be problematic. Specifically, if the service station is closed, no longer in business, or does not stock a supply of urea, it may be possible for the vehicle to run out of urea and still be operational. In this situation, the vehicle would no longer be compliant with emission regulations. In addition, the system of the '307 patent does not provide a strategy for dealing with a sufficient supply of urea that is simply unavailable at a required rate, such as when the urea supply is frozen and melting slowly.

The system of the present disclosure solves one or more of the problems set forth above.

SUMMARY OF THE INVENTION

One aspect of the present disclosure is directed to a control system for a power unit having a supply of fuel and a supply of reductant. The control system may include a first sensor associated with the supply of fuel to generate a signal indicative of a quantity of fuel remaining, and a second sensor associated with the supply of reductant to generate a signal indicative of a quantity of the reductant remaining. The control system may also include a controller in communication with the first and second sensors. The controller may be configured to affect operation of the power unit such that the remaining fuel is consumed before consumption of the remaining reductant.

Another aspect of the present disclosure is directed to a control system for a power unit having a supply of reductant. This control system may include a sensor associated with the supply of reductant to generate a signal indicative of a supply rate of the reductant. The control system may also include a controller in communication with the sensor. The controller may be configured to affect operation of the power unit such that a desired consumption rate of the reductant does not exceed the supply rate of the reductant.

Yet another aspect of the present disclosure is directed to a method of treating exhaust. The method may include combusting fuel to produce a power output and a flow of exhaust, and injecting a catalyst into the exhaust flow to aid in the reduction of an exhaust constituent. The method may also include determining an amount of remaining reductant, and determining an amount of remaining fuel. The method may further include altering the combusting of fuel such that the remaining fuel is consumed before the remaining reductant is consumed.

DETAILED DESCRIPTION

Figure 1:
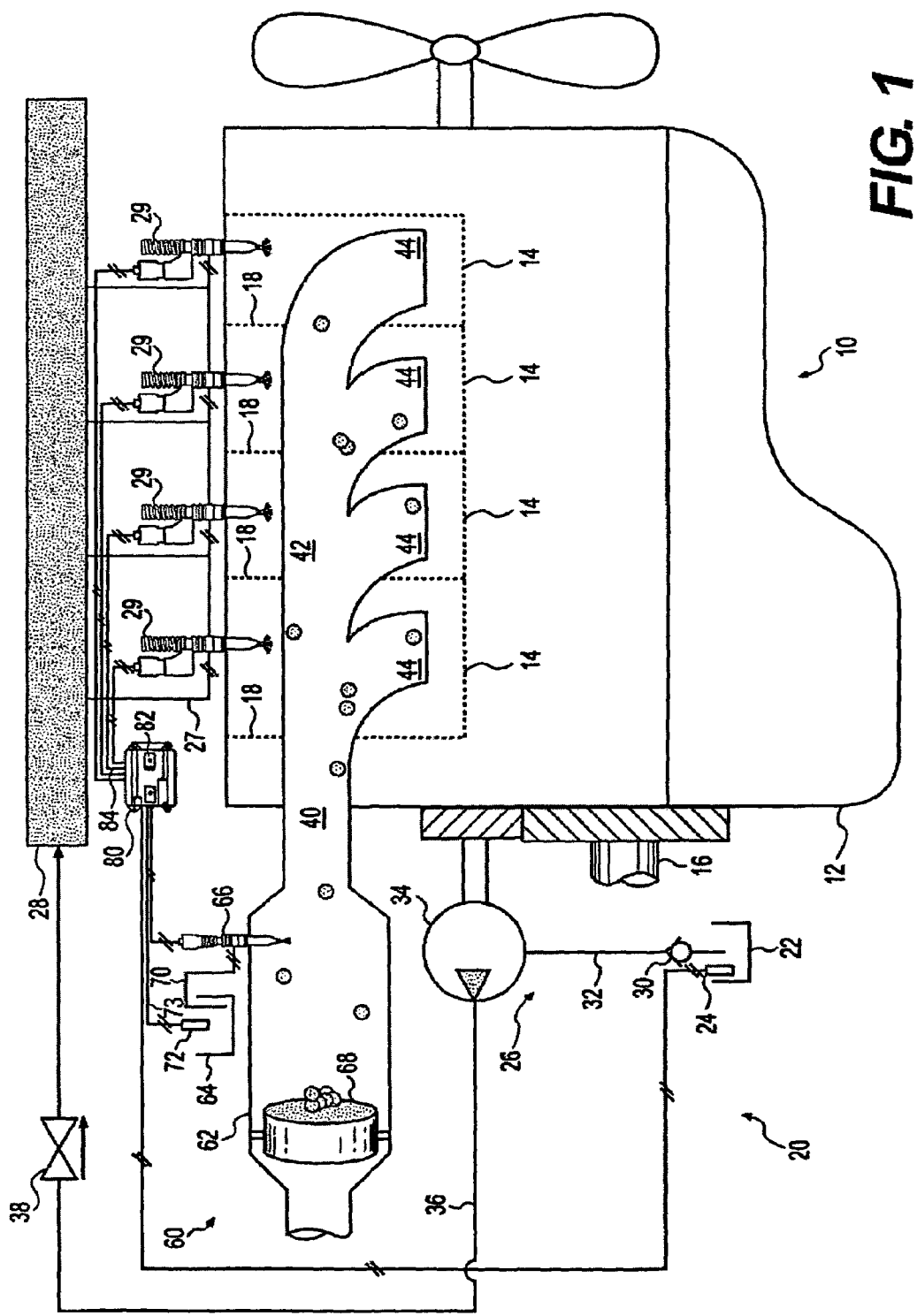
FIG. 1 is a schematic and diagrammatic illustration of an exemplary disclosed power system.

FIG. 1 illustrates a power unit 10 having a fuel system 20, an exhaust system 40, and an aftertreatment system 60. For the purposes of this disclosure, power unit 10 is depicted and described as a four-stroke diesel engine. One skilled in the art will recognize, however, that power unit 10 may be any other type of internal combustion engine such as, for example, a gasoline engine, a gaseous fuel-powered engine, or a turbine engine. Power unit 10 may include an engine block 12 that at least partially defines a plurality of combustion chambers 14. In the illustrated embodiment, power unit 10 includes four combustion chambers 14. However, it is contemplated that power unit 10 may include a greater or lesser number of combustion chambers 14 and that the combustion chambers 14 may be disposed in an "in-line" configuration, a "V" configuration, or any other suitable configuration.

As also shown in FIG. 1, power unit 10 may include a crankshaft 16 that is rotatably disposed within engine block 12. A connecting rod (not shown) may connect a plurality of pistons (not shown) to crankshaft 16 so that a sliding motion of each piston within the respective combustion chamber results in a rotation of crankshaft 16. Similarly, a rotation of crankshaft 16 may result in a sliding motion of the pistons.

Fuel system 20 may include components that cooperate to deliver injections of pressurized fuel into each combustion chamber 14. Specifically, fuel system 20 may include a tank 22 that holds a supply of fuel, a fuel sensor 24 associated with tank 22, and a fuel pumping arrangement 26 configured to pressurize the fuel and direct one or more streams of pressurized fuel to a manifold 28.

Tank 22 may constitute a reservoir that holds a supply of fuel. The fuel may include, for example, diesel fuel, gasoline, kerosene, a heavy fuel, or any other type of fuel known in the art. It is also contemplated that fuel system 20 may be connected to multiple separate fuel tanks, if desired.

Fuel sensor 24 may constitute a sensor known in the art to determine the level of remaining fuel in tank 22 and communicate that level to electronic controller 80. For example, fuel sensor 24 may be a float-type fuel gauge (not shown) or a magnetic level gauge (not shown).

Fuel pumping arrangement 26 may include one or more pumping devices that function to increase the pressure of the fuel. In one example, the fuel pumping arrangement 26 may include a high pressure source 34 and a low pressure source 30 disposed in series and fluidly connected by way of a fuel line 32. Low pressure source 30 may embody a transfer pump that provides low pressure feed to high pressure source 34, while high pressure source 34 may receive the low pressure feed and increase the pressure of the fuel to the range of about 40-300 MPa. High pressure source 34 may be connected to manifold 28 by way of a fuel line 36. A check valve 38 may be disposed within fuel line 36 to provide uni-directional flow of fuel from the fuel pumping arrangement 26 to manifold 28.

Fuel injectors 29 may be disposed within cylinder heads 18 and connected to manifold 28 by way of a plurality of fuel lines 27. Each fuel injector 29 may be operable to inject an amount of pressurized fuel into an associated combustion chamber 14 at predetermined timings and fuel pressures. The timing of fuel injection into combustion chamber 14 may be synchronized with the motion of the associated piston. For example, fuel may be injected as the piston nears a top-dead-center position in a compression stroke to allow for compression-ignited-combustion of the injected fuel. Alternatively, fuel may be injected as the piston begins the compression stroke heading towards a top-dead-center position for homogenous charge compression ignition operation. Fuel may also be injected as the piston is moving from a top-dead-center position towards a bottom-dead-center position during an expansion stroke for a late post injection to create a reducing atmosphere for aftertreatment regeneration. In order to accomplish these specific injection events, power unit 10 may request an injection of fuel from control system 80 at a specific start and/or end of injection (SOI or EOI) timing and specific start and/or end of injection (SOP or EOP) pressure.

Exhaust system 40 may direct exhaust from cylinders 14 to the atmosphere and may include an exhaust manifold 42 in fluid communication with exhaust passageway 44 via one or more cylinder 14. It is contemplated that exhaust system 40 may include other components such as, for example, a turbine, an exhaust gas recirculation system, a particulate filter, or any other exhaust system component known in the art.

Aftertreatment system 60 may include a treatment device 62 for the conditioning of exhaust in manifold 42. The treatment device 62 may include, for example, a reductant supply 64, an injector 66 connected to the reductant supply 64, and a catalyst substrate 68. The reductant may be drawn from supply 64, and sprayed by injector 66 onto catalyst substrate 68.

Reductant supply 64 may be fluidly connected to injector 66 through a flow line 70. Supply 64 may include a sensor 72 that determines the amount of remaining reductant within supply 64 and generates a signal indicative of that amount. Sensor 72 may also determine the parameters of supply 64 such as the temperature and rate of supply of the reductant in supply tank 64. The reductant contained in supply 64 may be any reductant known in the art to benefit such catalytic systems, such as urea or ammonia.

Reductant sensor 72 may constitute a sensor known in the art to determine the level of remaining fuel in tank 64 and communicate that level to electronic controller 80. For example, sensor 72 may be a float-type gauge or a magnetic level gauge.

Injector 66 may inject reductant from supply 64 into exhaust system 40 to reduce the concentration of a constituent therein. In one example, the constituent may include an oxide of nitrogen (NOx). The reductant reacts with the NOx in the exhaust gas to form $H_2O$ and $N_2$.

Catalyst substrate 68 may be disposed in exhaust system 40 downstream of exhaust manifold 42. Exhaust system 40 may direct flow of the exhaust-gas stream such that the exhaust-gas stream flows through catalyst substrate 68 in a substantially equally distributed manner and causes the constituent to contact and react with the reductant.

Catalyst substrate 68 may be made from a variety of materials. For example, catalyst substrate 68 may include a support material and a metal promoter dispersed within the catalyst support material. The support material may include at least one of alumina, zeolite, aluminophosphates, hexaluminates, aluminosilicates, zirconates, titanosilicates, and titanates, and the metal promoter may include silver metal (Ag). Combinations of these materials may be used, and the support material may be chosen based on the type of fuel used, the reductant used, the air to fuel-vapor ratio desired, and/or for conformity with environmental standards. One of ordinary skill in the art will recognize that numerous other catalyst compositions may be used without departing from the scope of this disclosure. Further, multiple catalytic devices may also be included with exhaust system 40.

Control system 80 may control operation of each fuel injector 29 in response to one or more inputs. In particular, control system 80 may include a controller 82 that communicates with fuel injectors 29 by way of a plurality of communication lines 84, with fuel sensor 24 by way of a communication line 25, and with reductant sensor 72 by way of a communication line 73. Controller 82 may control a fuel injection timing, pressure, and amount by applying a determined current waveform or sequence of determined current waveforms to each fuel injector 29 based on input from fuel sensor 24 and reductant sensor 72. Controller 82 may also communicate with other systems of the engine such as an air induction system, exhaust gas recirculation, etc.

Controller 82 may embody a single microprocessor or multiple microprocessors that include a means for controlling an operation of fuel system 20. Numerous commercially available microprocessors can be configured to perform the functions of controller 82. It should be appreciated that controller 82 could readily embody a general machine or power unit microprocessor capable of controlling numerous work machine or engine functions. Controller 82 may include all the components required to run an application such as, for example, a memory, a secondary storage device, and a processor, such as a central processing unit or any other means known in the art for controlling fuel system 20. Various other known circuits may be associated with controller 82, including power supply circuitry, signal-conditioning circuitry, solenoid driver circuitry, communication circuitry, and other appropriate circuitry.

Control system 80 may be in communication with fuel system 20, exhaust system 40 and aftertreatment system 60 to regulate the operation of power unit 10. A controller 82 may be in communication with reductant sensor 72 and fuel sensor 24. Controller 82 may change engine performance in response to various conditions as reported by the sensors. The change may be affected by changing other engine system parameters such as boost pressure, temperature, fuel injection timing, or any other method known in the art for affecting engine performance.

One or more control maps relating to normal engine operation mode, low-reductant engine operation mode, and low-reductant flow engine operation mode may be stored within the memory of control system 80. Each of these maps may be in the form of tables, graphs, and/or equations and include a compilation of data collected from lab and/or field operation of power unit 10. Control module 80 may reference these maps and affect the operation of power unit 10 accordingly.

INDUSTRIAL APPLICABILITY

The system of the present disclosure may be applicable to any power unit 10 utilizing an exhaust constituent reducing system including, for example, passenger vehicles, vocational work trucks, construction and earth-moving machines, and other similar devices known in the art. In fact, the disclosed power unit 10 may be implemented into any system that conditions its exhaust via an aftertreatment system utilizing a reducing agent. The operation of power unit 10 will now be explained.

Referring to FIG. 1, air and fuel may be drawn into the combustion chambers 14 of power unit 10 for subsequent combustion. Fuel may be injected into the combustion chambers 14 of power unit 10, mixed with the air therein, and combusted by power unit 10 to produce a mechanical work output and an exhaust flow of hot gases. The exhaust flow may contain a complex mixture of air pollutants composed of gaseous material, which can include oxides of nitrogen (NOx). As this NOx laden exhaust flow is directed from the combustion chambers 14 through exhaust and aftertreatment systems 40, 60, NOx may be removed from the exhaust flow by a chemical reduction process.

The untreated exhaust flow from power unit 10 may enter exhaust system 40 via exhaust manifold 42. As the exhaust flow enters the aftertreatment system 60, the reductant from tank 72 may be injected via reductant injectors 66 to mix with the exhaust flow.

The combined gaseous mixture of exhaust flow and reductant may then flow further downstream and react with the reductant as it passes through catalyst substrate 68. This reaction between the reductant-injected exhaust flow and catalyst substrate 68 may cause a constituent of the exhaust such as NOx and the reductant to react, converting the nitrogen oxide to pure nitrogen and water. The treated exhaust may then be released to the atmosphere.

The aftertreatment system 60 may rely on a substantially constant reductant supply from tank 64. If the reductant supply is entirely consumed, the aftertreatment process cannot function and the power unit 10 may be required by industry or governmental regulations to immediately cease operation.

It is an objective of the present disclosure to prevent total exhaustion of the reductant supply before the fuel supply is exhausted. In this manner, operation of power unit 10 may continue in a low-reductant engine operation mode rather than requiring the power unit 10 to cease operation entirely.

Figure 2:
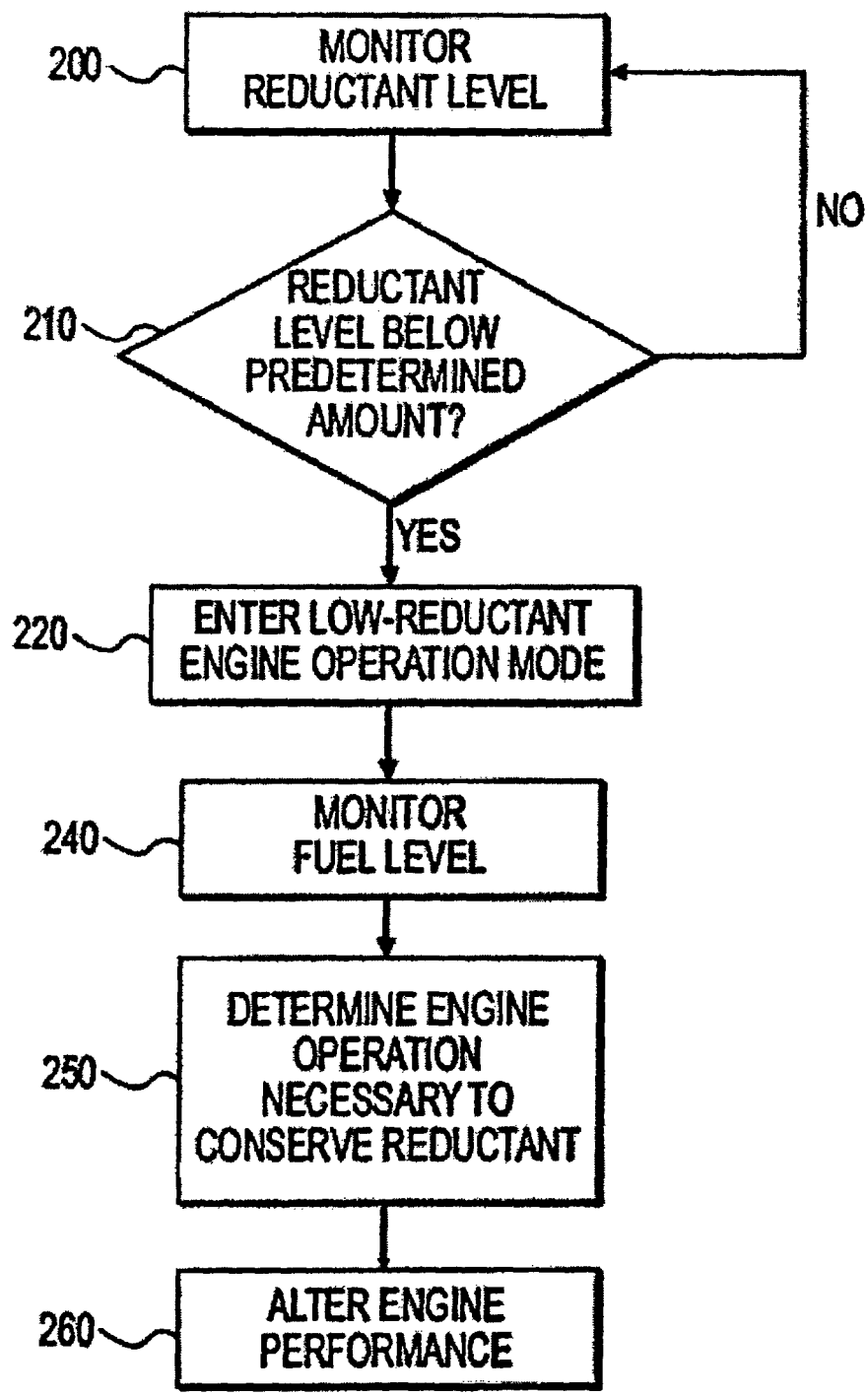
FIG. 2 is a flowchart depicting an exemplary disclosed operation of the power system of FIG. 1.

According to FIG. 2, in one exemplary embodiment of the present disclosure, reductant supply sensor 72 may monitor the level of the reductant in reductant tank 64 (step 200). If the reductant level is above a predetermined amount (i.e., sufficient for a continued normal operation) (step 210;no), sensor 72 may continue to monitor the level of the reductant in the reductant tank 64 (step 200) without further action being taken. However, if that level of available reductant drops below a predetermined amount (step 210;yes), sensor 72 may notify controller 82, which may initiate a low-reductant engine operation mode (step 220).

In low-reductant engine operation mode, controller 82 may monitor the fuel level in fuel tank 22 using sensor 24 (step 240). Taking into account the remaining levels of fuel and reductant, controller 82 may determine, based on the maps stored in the memory thereof, an engine operation mode necessary to conserve reductant (step 250). Based on that determination, the control system 80 may then alter engine performance to produce the engine operation mode necessary to conserve reductant (step 260).

For example, in response to a low level of reductant being determined, control system 80 may retard injection timing. At this retarded timing, the peak combustion temperatures within combustion chambers 14 may result in a lower NOx production rate, thereby reducing the reductant consumption rate and simultaneously increasing the fueling rate required to maintain power. Decreasing a boost pressure and/or increasing an exhaust gas recirculation rate may have a similar effect. This low-reductant operation mode may cause power unit 10 to exhaust its fuel supply before its reductant supply, while still remaining compliant with emission regulations.

In the illustrated embodiment, control system 80 alters the engine performance by retarding the injection timing and thus changing the air to fuel ratio. However, it is contemplated that changing the air to fuel ratio can also include throttling, exhaust gas recirculation, or any other process that results in changing the amount of air in the combustion chamber.

Figure 3:
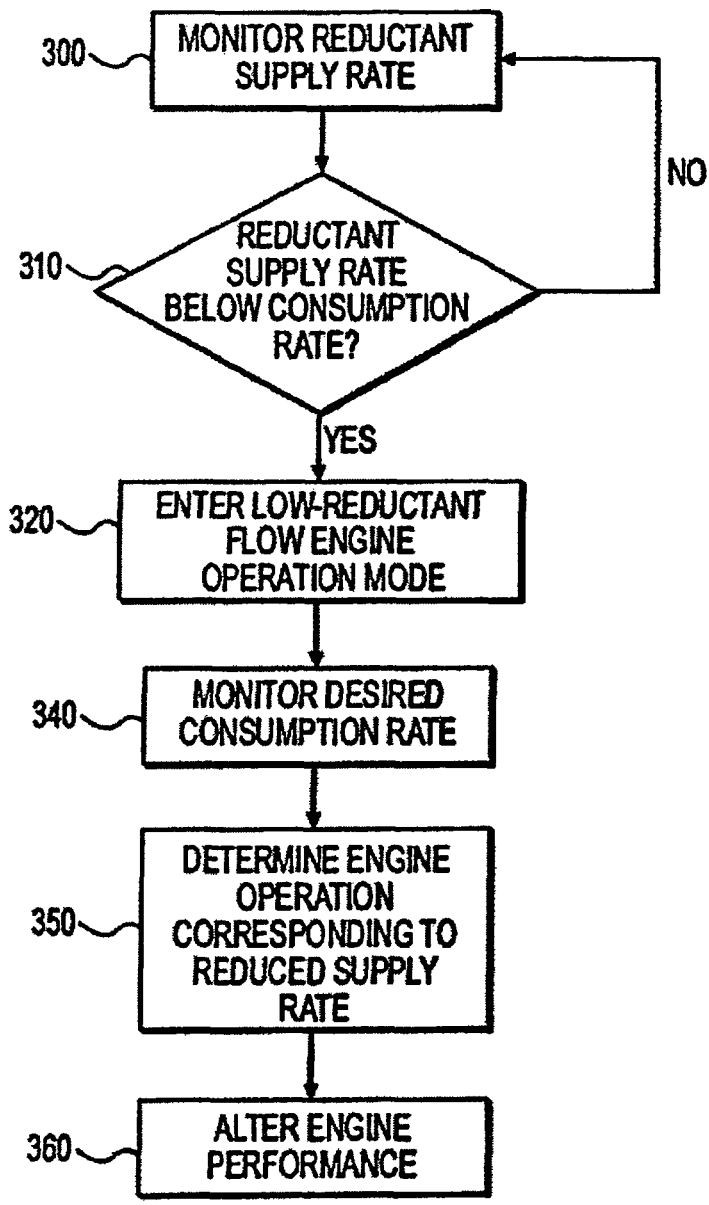
FIG. 3 is another flowchart depicting another exemplary disclosed operation of the power system of FIG. 1.

It is a further objective of the present disclosure to allow power unit 10 to operate in a low-reductant flow engine operation mode when the supply rate of reductant from tank 64 is lower than a predetermined consumption rate at which the power unit could operate in a normal mode. According to FIG. 3, in another exemplary embodiment of the present disclosure, a supply sensor 72 may monitor the supply rate of the reductant from reductant tank 64 (step 300). If the current reductant supply rate is above the current consumption rate (i.e., sufficient for continued operation) (step 310;no), sensor 72 may continue to monitor the supply rate of the reductant (step 300) without further action being taken. However, if the reductant supply sensor 72 confirms that the supply rate of reductant is below the current desired consumption rate (step 310;yes), sensor 72 may notify controller 82, which may initiate a low-reductant flow engine operation mode (step 320). This may be the case where the reductant supply is frozen and slowly being thawed naturally or by a heating element (not shown) at a rate slower than that which is desired for consumption.

In low-reductant flow engine operation mode, controller 82 may also monitor the current desired consumption rate (step 340). Based on the difference between the current reductant supply rate and the desired consumption rate, control system 80 may determine an engine operation mode necessary to reduce reductant consumption to a rate below the current supply rate (step 350). Control system 80 may then alter engine performance to reduce reductant consumption rate below the current supply rate (step 360).

Similar to the low-reductant engine operation mode described above, the low-reductant flow engine operation mode may cause the power unit 10 to run less efficiently and at a higher temperature, thereby increasing fuel consumption and decreasing the rate of reductant use. This operation mode may cause power unit 10 to exhaust its fuel supply before its reductant supply.

The present disclosure allows an operator of a power unit 10 to continue operation until the fuel supply is exhausted. If, for example, a vehicle operator in low-reductant engine operation mode arrives at a service station only to find out that service station is closed or out of reductant, the operator may continue to travel as far as the current fuel supply will allow. This may be beneficial because an experienced operator is unlikely to run out of fuel during a workshift.

The present disclosure may also ensure that the vehicle is compliant with emission regulations as long as it is operational, and the vehicle is operational as long as it has a fuel and reductant supply. Since future emission regulations may require a power unit to shut down immediately once the reductant supply is exhausted even if a fuel supply is still present, this system may allow the operator to extend the operation of the power unit as long as a fuel supply remains.

Another advantage of the present disclosure is that it provides a strategy for dealing with a sufficient supply of reductant that is simply unavailable at a required rate, such as when the reductant is frozen and melting slowly. This allows operation to continue at a low-reductant and high-fuel use mode where previous systems would require a period in which all operation was prohibited to allow a sufficient supply of reductant to melt.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A control system for an engine having a supply of fuel and a supply of reductant, the control system comprising:
    a first sensor associated with the supply of fuel to generate a signal indicative of a quantity of fuel remaining;
    a second sensor associated with the supply of reductant to generate a signal indicative of a quantity of the reductant remaining; and
    a controller in communication with the first and second sensors, the controller configured to alter operation of the engine based on input from the second sensor such that the remaining fuel is consumed before consumption of the remaining reductant.

2. The control system of claim 1, wherein the reductant is urea and configured to reduce an oxide of nitrogen.

3. The control system of claim 1, wherein the controller alters operation of the engine by changing at least one of a fuel injection timing, an exhaust gas recirculation rate, or an intake air composition to increase a consumption rate of the fuel relative to a consumption rate of the reductant.

4. The control system of claim 1, wherein the altering of the operation of the engine is initiated when the quantity of remaining reductant is less than a predetermined amount.

5. The control system of claim 1, wherein:
    the second sensor is further configured to generate a signal indicative of a supply rate of the reductant; and
    the controller is further configured to affect operation of the power unit such that a desired consumption rate of the reductant does not exceed the supply rate of the reductant.

6. The control system of claim 5, wherein the desired consumption rate is a rate at which reductant injected into an exhaust stream reduces the concentration of an exhaust constituent to within an acceptable range.

7. The control system of claim 5, wherein the sensor is configured to detect a parameter indicative of a melting rate of frozen reductant.

8. The control system of claim 5, wherein operation of the engine is altered when the supply rate of the reductant is less than a predetermined rate.

9. A control system for a power unit having a supply of reductant, the control system comprising:
    a sensor associated with the supply of reductant to generate a signal indicative of a supply rate of the reductant; and
    a controller in communication with the sensor, the controller configured to alter operation of the power unit based on the supply rate of the reductant such that a desired consumption rate of the reductant does not exceed the supply rate of the reductant.

10. The control system of claim 9, wherein the sensor is configured to detect a parameter indicative of a melting rate of frozen reductant.

11. The control system of claim 9, wherein the reductant is urea.

12. The control system of claim 9, wherein the operation of the power unit is altered by changing an air to fuel ratio.

13. The control system of claim 9, wherein the altering of the power unit is initiated when the supply rate of the reductant is less than a predetermined rate.

14. A method of treating exhaust, comprising:
    combusting fuel to produce a power output and a flow of exhaust;
    injecting a reductant into the exhaust flow to aid in the reduction of an exhaust constituent;
    determining an amount of remaining reductant;
    determining an amount of remaining fuel;
    altering the combusting of fuel based on the determined amount of remaining reductant such that the remaining fuel is consumed before the remaining reductant is consumed.

15. The method of claim 14, wherein the reductant is urea and the constituent is an oxide of nitrogen.

16. The method of claim 14, wherein the altering of the combusting of fuel is initiated when the amount of remaining reductant is less than a predetermined amount.

17. The method of claim 14, further including:
    determining a melting rate of the reductant; and
    altering the combusting of fuel such that a desired consumption rate of the reductant does not exceed the melting rate.

18. The method of claim 17, wherein the desired consumption rate is a rate at which the reductant must be injected into the flow of exhaust reduces the concentration of the exhaust constituent to within an acceptable range.

19. The method of claim 17, wherein the altering of the combusting of fuel is initiated when the melting rate of the reductant is less than a predetermined amount.

20. The control system of claim 1, wherein the controller, in response to determining that the quantity of the reductant remaining is below a threshold value, modifies operation of the engine to increase the consumption rate of fuel relative to the consumption rate of urea.

\* \* \* \* \*